United States Patent [19]
Ishii et al.

[11] Patent Number: 4,505,968
[45] Date of Patent: Mar. 19, 1985

[54] RESINOUS FLOORING SHEET

[75] Inventors: Taiji Ishii, Tokyo; Takashi Tarutani, Sakado, both of Japan

[73] Assignee: Dai Nippon Insatsu Kabushiki Kaisha, Tokyo, Japan

[21] Appl. No.: 451,428

[22] Filed: Dec. 20, 1982

[30] Foreign Application Priority Data

Dec. 24, 1981 [JP] Japan ............................ 56-212607

[51] Int. Cl.³ ................................................ B32B 3/00
[52] U.S. Cl. .................................... 428/172; 428/212; 428/203; 428/913
[58] Field of Search ................ 428/203, 212, 913, 172

[56] References Cited

U.S. PATENT DOCUMENTS

| | | | |
|---|---|---|---|
| 3,049,459 | 8/1962 | Smith et al. | 428/203 |
| 3,157,561 | 11/1964 | Miller et al. | 428/203 |
| 3,518,153 | 6/1970 | Slosberg et al. | 428/203 X |
| 3,725,184 | 4/1973 | Scopp | 428/203 |
| 3,808,024 | 4/1974 | Whitman | 428/203 X |
| 3,951,714 | 4/1976 | Franco | 427/197 |

Primary Examiner—George F. Lesmes
Assistant Examiner—Nancy A. B. Swisher
Attorney, Agent, or Firm—Parkhurst & Oliff

[57] ABSTRACT

A resinous flooring sheet is obtained by laminating successively on a light-shielding resinous base sheet (1), a transparent synthetic resin intermediate layer (2), a light-shielding ink pattern (3) and an overcoat transparent synthetic resin layer (4). This flooring sheet can impart abundant three-dimensional or visual depth impression through the optical path difference between the reflected light from the light-shielding ink pattern (3) and the reflected light from the light-shielding synthetic resinous base sheet (1) as well as through the shading of the light-shielding pattern (3) projected through the transparent synthetic resin intermediate layer (2) on the light-shielding synthetic resinous base sheet (1).

5 Claims, 10 Drawing Figures

RESINOUS FLOORING SHEET

BACKGROUND OF THE INVENTION

This invention relates to a resinous flooring sheet, more particularly to a resinous flooring sheet imparting excellent three-dimensional impression (visual depth) and comprising a light-shielding pattern provided on a transparent intermediate resin layer.

Flooring sheets made of synthetic resins and having visual depth have been well known in the art. As a typical example, there is a sheet having opaque colored strips of a synthetic resin embedded in a transparent synthetic resin layer. Such a resinous flooring sheet, while imparting excellent three-dimensional impression (visual depth) due to the transparency of the transparent synthetic resin layer between the colored strips, has a limitation with respect to formation of free designs. Alternatively, it is also known to impart three-dimensional impression by printing. For example, mention may be made of the method in which printing is performed with the use of a printing plate prepared by taking out shading according to a photographic process and the method in which sensation of depth is created by utilization of difference in luster. However, the three-dimensional impressions obtained by these methods are imitative in nature and far from satisfactory.

SUMMARY OF THE INVENTION

An object of the present invention is to provide a resinous flooring sheet having free designability as well as the property of imparting excellent three-dimensional impression.

According to the studies we have made, it has been found that a structure comprising two layers of transparent synthetic resins formed on a light-shielding synthetic resin base sheet and having a light-shielding pattern inserted between these transparent synthetic resin layers is very effective for accomplishing the above object. That is, the resinous flooring sheet according to the present invention comprises a transparent synthetic resin intermediate layer laminated on the surface of a light-shielding resinous base sheet, a light-shielding pattern constituted by a light-shielding ink provided on the surface of the transparent synthetic resin intermediate layer, and an overcoat transparent synthetic resin layer laminated on the entire surface including the transparent synthetic resin intermediate layer and the light-shielding pattern.

The reason why the resinous flooring sheet imparts an excellent three-dimensional impression is that the light rays, penetrating into the transparent synthetic resin layer and reaching the surface of the light-shielding resinous base sheet without being shielded by the light-shielding pattern, are reflected by the surface to be visually observed, while the light rays, penetrating into the transparent synthetic resin layer and impinging on the light-shielding pattern, are reflected by the pattern surface to be visually observed simultaneously with formation of a shading corresponding to the light-shielding pattern on the surface of the light-shielding synthetic resin base sheet, the shading being also visually observed, whereby a three-dimensional sensation according to the optical path difference can be visually received.

The nature, utility, and further features of this invention will be more clearly apparent from the following detailed description, beginning with a consideration of general aspects of the invention and concluding with specific examples of practice thereof, when read in conjunction with the accompanying drawing, briefly described below.

BRIEF DESCRIPTION OF THE DRAWINGS

In the drawings, FIG. 1 to FIG. 9 are all schematic partial sectional views taken in planes parallel to the thickness directions of resinous flooring sheets, wherein:

FIG. 1, FIGS. 4 to 9 show embodiments of the resinous flooring sheets according to the present invention;

FIG. 2 shows an exemplary structure of the base sheet; and

FIG. 3 indicates a mode of judgement of the light-shielding property of the base sheet.

DETAILED DESCRIPTION OF THE INVENTION

Figure 1:
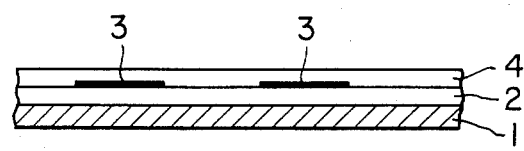

In its basic mode, the resinous flooring sheet of the present invention comprises, as shown in FIG. 1, a transparent synthetic resin intermediate layer 2, a light-shielding pattern 3 and an overcoat transparent resin layer 4 formed successively on a light-shielding resinous base sheet 1.

As the light-shielding resinous base sheet 1, any of conventional materials available as base sheet for resinous flooring sheets, which may be classified broadly into (a) materials constituted primarily of synthetic resins and (b) synthetic resins reinforced with reinforcing materials can be employed.

An example of the former (a) is any synthetic resin sheet, especially a single composite synthetic resin sheet filled with a large amount of light-shielding pigment. As such synthetic sheets, among thermoplastic synthetic resin sheets, those having excellent heat resistance, humidity resistance, dimensional stability as well as mechanical strength, such as sheets of polyvinyl chloride, polyethyleneterephthalate, polyethylene, polypropylene, and polycarbonate can be used. It is also possible to use sheets of thermosetting resins such as of urethane or epoxy resins. These sheets can be fabricated according to calendering, casting, extrusion or inflation. Alternatively, a synthetic resin expanded sheet prepared by expanding a synthetic resin sheet containing a blowing agent previously incorporated by kneading during sheet fabrication can be used. Cushioning characteristics can be improved by use of an expanded synthetic resin sheet.

Figure 2:
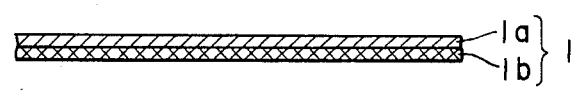

For the latter material (b), a resin sheet 1a similar to that as described in the above (a), which is backed by a reinforcing material 1b as shown in FIG. 2 or has a reinforcing material incorporated internally therein can be employed. As the reinforcing material, it is preferable to use one with good adhesiveness to the synthetic resin sheet which can improve the dimensional stability of the synthetic resin and, when used as a backing, can prevent oozing-out of moisture and alkalis from the floor on which the resinous flooring sheet is to be laminated or spread. Typical examples of such reinforcing materials are asbestos sheets, asbestos papers, unwoven or woven fabrics of glass fibers, unwoven or woven fabrics of polyester, rayon, and polychlal.

Preparation of a light-shielding resinous base sheet reinforced with a reinforcing material may be carried out according to, for example, the method in which a synthetic resin paint is applied on the surface of the reinforcing material 1b as described above to form a coating thereon, the method in which a sealing coating is previously applied on a reinforcing material and thereafter a coating is applied again thereon, the method in which a synthetic resin sheet previously prepared separately is laminated on a reinforcing material, or any other appropriate method.

Figure 3:
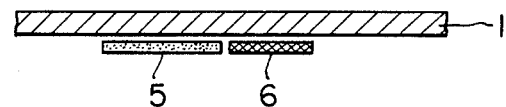

The light-shielding characteristic of the light-shielding resinous base sheet 1 will be sufficient as long as it can shield off substantially the color on the floor surface to the extent that no boundary between the white paper 5 and the black paper 6 is discernable when they are juxtaposed in contact with each other and the light-shielding resinous base sheet is placed thereon as shown in FIG. 3. The light-shielding characteristic can be imparted by addition of a light-shielding pigment such as titanium white.

The surface of the light-shielding resinous base sheet, that is, the surface on which the transparent synthetic resin intermediate layer as described hereinafter is to be laminated, can be colored as desired, either by using a resinous composition or a paint containing a colorant at the time of fabrication of the light-shielding resinous base sheet or by coloring the surface of a once fabricated light-shielding resinous base sheet material by coating or printing.

The light-shielding resinous base sheet should have a thickness which can substantially shield the color of the floor surface when formed into a resinous flooring sheet. The thickness may be determined from such practical standpoints, when formed into a resinous flooring sheet, as to cancel concave-convex irregularities by covering more or less such irregularities on the floor surface, to improve the feel of walking by imparting a cushioning characteristic thereto, or to prevent exposure of the floor surface before the resinous flooring sheet becomes obsolete in fashion after withstanding abrasion sufficiently and is to be replaced with a new one. Thus, the base sheet may have a thickness within a range which can realize a total thickness of the resinous flooring sheet generally of 1 to 3 mm. To be more specific, although it is not possible to define in general terms, it may have a thickness ordinarily of 0.2 mm or more.

Considering now the transparent synthetic resin intermediate layer 2 to be laminated on the surface of the light-shielding resinous base sheet 1, it can be either colorlessly transparent or transparent with a color and have a thickness which is preferably about 0.1 to 1.0 mm from the standpoint of the thickness of the flooring sheet product as well as the effect of imparting a desirable three-dimensional impression. The transparent synthetic resin intermediate layer 2 preferably has a transmittance (relative to visible light) of 50% or higher. Such a transparent synthetic resin intermediate layer 2 can be formed by lamination according to adhesion or fusion of a transparent synthetic resin sheet or by coating with the use of a transparent synthetic resin paint.

For the transparent synthetic resin sheet, synthetic resin sheets as mentioned above which are colorlessly transparent or transparent with coloration can be employed. For the transparent synthetic resin paint, any of those which are transparent per se or those which can become transparent after application as a coating by drying or heat setting can be used. As the transparent synthetic resin paint, a composition comprising a vehicle, suitably selected in view of its adhesion characteristic relative to the light-shielding resinous sheet as described above and kneaded optionally with a colorant comprising a dye or pigment with small shielding power, plasticizer, stabilizer, surfactant, wax or grease, drying agent, auxiliary drying agent, hardener, emulsifier, thickener, filler, dispersant, solvent and diluent can be used.

As a vehicle, use can be made of one or more kinds selected from cellulose derivatives such as ethyl cellulose, ethylhydroxyethyl cellulose, cellulose acetate propionate, nitrocellulose, cellulose acetate, etc; styrene resins and styrene copolymer resins such as polystyrene, poly-α-methylstyrene; homopolymer or copolymer resins of acrylic or methacrylic compounds such as polymethyl methacrylate, polyethyl methacrylate, polyethyl acrylate, polybutyl acrylate, etc.; rosin, rosin ester resins such as rosin-modified maleic acid resins, rosin-modified phenol resins, polymerized rosin, etc.; polyvinyl acetate resins; cumaron resins; vinyl toluene resins; vinyl chloride resins; polyester resins; polyurethane resins; butyral resins; polyamide resins; vinyl chloridevinyl acetate copolymer resins; and so on.

Next, the light-shielding pattern 3 to be provided on the surface of the transparent synthetic resin intermediate layer 2 can be formed by printing with the use of a light-shielding ink. As the light-shielding ink, any of those in which a large amount of light-shielding pigment is added to ordinary inks or those in which the colorant in ordinary inks is replaced with a light-shielding colorant can be used. As the vehicle for the light-shielding ink, one suitably selected in view of its adhesion characteristic relative to the aforesaid transparent synthetic resin intermediate layer from those mentioned above as the vehicle for the transparent synthetic resinous paint can be used. For example, light-shielding property can be imparted by the addition of titanium white or the like to the vehicle, and in addition there may also be added and admixed by kneading other additives as desired such as a colorant dye or pigment, plasticizer, stabilizer, surfactant, wax or grease, drying agent, auxiliary drying agent, hardener, emulsifier, thickener, filler, dispersant, solvent and diluent, to prepare a desirable composition to be used.

The light-shielding pattern 3 can be provided on the surface of the transparent synthetic resin intermediate layer 2 as described above with the use of the light-shielding ink as described above according to printing methods well known in the art. Examples of the known printing methods are gravure printing, gravure offset printing, litho-offset printing, direct lithography printing, letterpress printing, intaglio printing, jet printing, silk-screen printing, and electrostatic printing. Other than the method in which the light-shielding pattern 3 is printed directly on the transparent synthetic resin intermediate layer 2 by means of a printing machine, the transfer printing method in which a transfer paper is prepared previously on a releasable substrate sheet, and, with the use of this transfer paper, the light-shielding pattern is transferred onto the transparent synthetic resin intermediate layer ordinarily through heating can be used.

The light-shielding pattern 3 is preferably formed on the transparent synthetic resin intermediate layer 2 preferably in a proportion of 2 to 5 g/m$^2$ (as solid) and preferably has a light transmittance preferably of 10% or lower.

The transparent synthetic resin layer 4 to be laminated on the entire surface including the transparent synthetic resin intermediate layer 2 and the light-shielding pattern 3 is laminated for the purpose of protection of the underlying light-shielding pattern 3 and the transparent synthetic resin intermediate layer 2. It is desirable that this layer 4 have suitable abrasion resistance, heat resistance, weathering resistance, friction coefficient, etc. for this purpose, but a material similar to those mentioned for the transparent synthetic resin intermediate layers can also be used. However, for a resinous flooring sheet which is very frequently used or subjected to use under severe conditions, it is preferable to use a transparent synthetic resin layer formed with the use of a plastisol for which a vehicle having higher polymerization degree than those in the solution type paints, in general, is used or a transparent synthetic resin layer formed with the use of a paint of thermosetting type or of the type curable with UV-ray or electron beam. The transparent synthetic resin layer 4 preferably has a thickness generally in the range from 0.1 to 0.5 mm and a light transmittance of 90% or higher.

In addition to the above described most basic mode of the resinous flooring sheet of the present invention, various modifications and other embodiments of the invention as described below are also possible.

Figure 4:
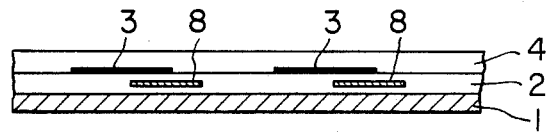
Figure 5:
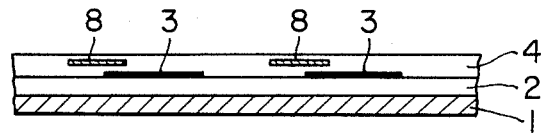
Figure 5A:
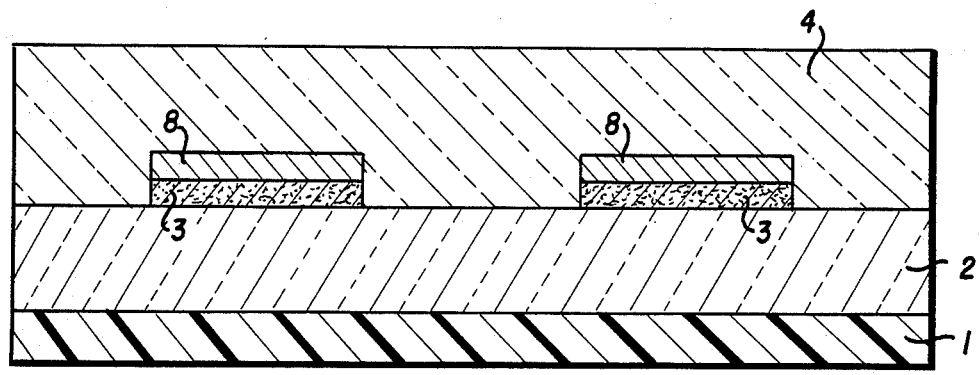

(a) First, any desired non-light-shielding pattern 8 with the use of an ordinary ink may be provided between the light-shielding synthetic resin base sheet 1 and the transparent synthetic resin intermediate layer 2 (FIG. 4) as well as between the transparent synthetic resin intermediate layer 2 and/or the light-shielding pattern 3 and the transparent synthetic resin layer 4 (FIG. 5, FIG. 5A). In this case, the transparent synthetic resin intermediate layer 2 and/or the transparent synthetic resin layer 4 can be divided into a plurality of layers, between which the non-light-shielding pattern 8 can be formed by printing, for example. Alternatively, it is also possible to provide another light-shielding pattern 3 not specifically shown in the drawing in place of or in addition to the non-light-shielding pattern 8, whereby the light shielding pattern 3 can be embedded at a different depth. Of course, the non-light-shielding pattern 8 can be formed in direct contact on or side by side at the same depth with the light-shielding pattern 3. Other than the ordinary inks used, a penetrating ink or a sublimating ink can also be used, whereby either direct printing or indirect printing with the use of a transfer paper can be carried out.

When a pattern with the same external shape partially or totally as the light-shielding pattern is formed of an ordinary ink superposed thereon, the light-shielding pattern can be seen to be floating and therefore even a pattern formed with the use of an ordinary ink or a transparent ink can also be seen to be floating.

(b) The light-shielding resinous base sheet and/or the light-shielding pattern may be of any desired color, but white or a pale color close to white is preferred. By use of white color or a pale color close to white color, the three-dimensional impression can be highly accented through the contrast between the reflected light from the light-shielding pattern 3 and the shading of the light-shielding pattern.

Figure 6:
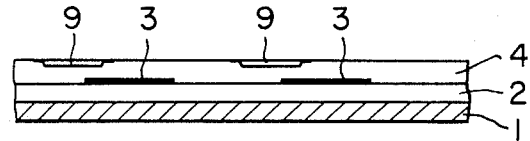
Figure 7:
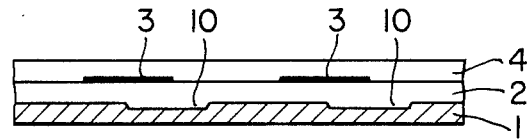

(c) The transparent synthetic resin layer 4 preferably has a mirror surface for good contrast of the three-dimensional impression, but an embossed pattern 9 may also be formed by suitable embossing means (FIG. 6). Alternatively, it is also possible to employ the chemical embossing method known as one embossing method, wherein embossing 10 is applied on an expanded sheet with the use of an ink composition containing a foaming inhibitor agent or a foaming promotor agent when using as the light-shielding resinous sheet 1 an expanded synthetic resin sheet, its composite, or a reinforced product thereof backed with a reinforcing material. According to this method, a resinous flooring sheet having an embossed pattern as shown in FIG. 7 can be obtained.

Figure 8:
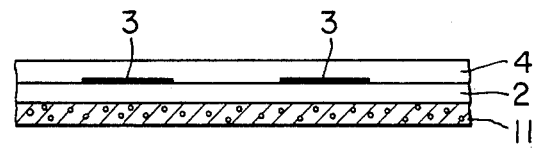
Figure 9:
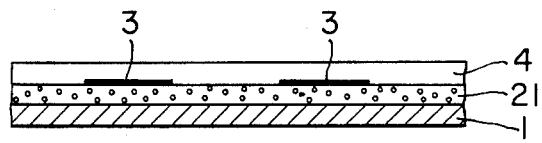

(d) The light-shielding resinous base sheet 11 and/or the transparent synthetic resin intermediate layer 21 may also contain a pearl lustre pigment (FIG. 8, FIG. 9), and as the pearl lustre pigment pearl powder, powders of a shell, mica flakes, etc., can be employed. Three-dimensional impression can also be highly accented by the use of a material containing such a pearl pigment.

The present invention, providing a resinous flooring sheet of the structure as described above, enables formation of a light-shielding pattern by printing, whereby a free design can be easily formed to impart a three-dimensional impression which is not imitative or illusory but is real. The resinous flooring sheet having such a structure has also the advantage that it can be produced by utilizing the respective steps of the prior art as such, thus being suitable for mass production.

In order to indicate more fully the nature and utility of this invention, the following examples of actual practice are set forth, it being understood that these examples are presented as illustrative only and are not intended to limit the scope of the invention.

EXAMPLE 1

A white polyvinyl chloride sol having a composition A as set forth below was applied as a coating on an asbestos paper (Aspaal, produced by Jujo Seishi Co.; thickness: 0.7 mm) by means of a Comma Coater and then heated in a hot-airstream furnace at 180° C. for one minute for gelation to form a first layer. Further, this layer was coated by means of a Comma Coater with a transparent polyvinyl chloride sol having a composition B as set forth below, which was gelated by heating in a hot-airstream furnace at 180° C. for one minute to form a second layer, thus preparing a flooring base sheet. The first layer and the second layer were made to have thicknesses of 0.2 mm and 0.4 mm, respectively.

| Polyvinyl chloride sol A | |
| --- | --- |
| PVC paste resin (121, produced by Nippon Zeon K.K.) | 50 parts by weight |
| PVC paste resin (103 ZX, produced by Nippon Zeon K.K.) | 20 parts by weight |
| Dioctyl phthalate | 35 parts by weight |
| Calcium carbonate | 20 parts by weight |
| Titanium oxide | 10 parts by weight |
| Stabilizer | 4 parts by weight |

| Polyvinyl chloride sol B | |
| --- | --- |
| PVC paste resin (121, produced by Nippon Zeon K.K.) | 50 parts by weight |
| PVC paste resin (103 ZX, produced by Nippon Zeon K.K.) | 20 parts by weight |
| Dioctyl phthalate | 25 parts by weight |
| Stabilizer (Adekacizer O-130 P, produced by Adeka-Argus K.K.) | 2 parts by weight |
| Stabilizer (Mark FL-21, produced by | 3 parts by weight |

-continued

| Polyvinyl chloride sol B |
| --- |
| Katsuta Kogyo K.K.) |

As the next step, with the use of a silk-screen printing plate of 120 mesh, a pattern was printed with a silk-screen ink C having a composition as specified below on the surface of the second layer and dried. Then, the above polyvinyl chloride sol B was further applied as a coating by means of a bar coater and then gelated by heating at 200° C. in a hot-airstream furnace for 2.5 minutes, to produce a transparent layer of a thickness of 0.2 mm on the second layer having the pattern. The thus prepared flooring sheet was found to impart a three-dimensional impression with the pattern appearing to be floating.

| Silk-screen ink C | |
| --- | --- |
| PVC paste resin (Zeon 131, produced by Nippon Zeon K.K.) | 100 parts |
| DOP | 50 parts |
| Titanium oxide | 30 parts |
| Stabilizer (Mark FL - 21, produced by Katsuta Kogyo K.K.) | 4 parts |
| Solvent (Solvesso Y 150, produced by Exxon) | 3 parts |

EXAMPLE 2

A releasable paper was formed by coating a release layer comprising a polypropylene resin on the surface of a fine paper (basis weight of 30 g/m²) by extrusion coating to a thickness of 30 μm, and on the release surface of the resultant releasable paper was printed a pattern with a colored ink D having a composition as set forth below. Further, printing was so carried out with the use of a white ink E having a composition as specified below that the white ink covered the portion printed with the colored ink to prepare a transfer paper.

The printed surface of the transfer paper thus obtained was superposed on the second layer of the flooring base sheet as prepared in Example 1, and transfer was effected by means of a heating roll at 200° C. under a line pressure of 8 to 10 kg/cm², which was followed by lamination of a surface layer of a transparent polyvinyl chloride sheet having a thickness of 0.2 mm and containing 46 parts of plasticizer per 100 parts of resin according to the thermal fusion method to provide a flooring sheet. The flooring sheet obtained had a colored pattern carried on a white pattern, and the colored pattern appeared to be floating as a result of the floating appearance of the white pattern.

| Colored ink D | |
| --- | --- |
| Polyvinyl chloride resin (VYHH, produced by Union Carbide Co.) | 10 parts by weight |
| Acrylic resin (Dianar 80, produced by Mitsubishi Rayon K.K.) | 5 parts by weight |
| Pigment | 10-20 parts by weight |
| Solvent (Methyl ethyl ketone/toluene = 3/1) | 60-75 parts by weight |

| White ink E | |
| --- | --- |
| Polyvinyl chloride resin (VYHH, produced by Union Carbide Co.) | 10 parts by weight |
| Acrylic resin (Dianar 80, produced by Mitsubishi Rayon K.K.) | 5 parts by weight |
| Titanium white | 35 parts by weight |
| Solvent (Methyl ethyl ketone/toluene = 3/1) | 60 parts by weight |

EXAMPLE 3

A base sheet was prepared by applying as a coating a foamable polyvinyl chloride sol having a composition F as set forth below on the surface of an asbestos paper to a thickness of 0.1 mm with a knife coater, and carrying out semi-gelling by heating in a hot-airstream furnace at 180° C. for one minute.

As the next step, on the back face of a polyvinyl chloride sheet of a thickness of 0.2 mm was printed a tile joint pattern with the use of a foaming inhibiting ink G having a composition as specified below. Then, on the surface of the polyvinyl chloride sheet was printed a pattern with the use of the colored ink D as employed in Example 2, and further printing was carried out with the use of the white ink E as used in Example 2 superposed on the portion printed with the colored ink D. The printed sheet thus obtained was thermally fused onto the base sheet with the side printed with the foaming inhibiting ink attached to the surface of the base sheet. Further, after applying a polyurethane type paint on the surface and drying, foaming was caused by heating in a hot-airstream furnace at 200° C. for 2.5 minutes. As the result, there was obtained a flooring sheet imparting a three-dimensional impression at the pattern portion and also having concave parts at the tile joint pattern.

| Foaming PVC sol F | |
| --- | --- |
| PVC Paste resin (121, produced by Nippon Zeon K.K.) | 100 parts by weight |
| Dioctyl phthalate | 30 parts by weight |
| Blowing agent (azodicarbonamide) | 3 parts by weight |
| Stabilizer (Mark FL 21, produced by Katsuta Kogyo K.K.) | 3 parts by weight |
| Titanium white | 8 parts by weight |

| Foaming inhibiting ink G | |
| --- | --- |
| Polyvinyl chloride (VYHH, produced by Union Carbide Co.) | 10 parts by weight |
| Acrylic resin (Dianar 80, produced by Mitsubishi Rayon K.K.) | 5 parts by weight |
| Phthalocyanine Blue | 5 parts by weight |
| Trimellitic acid anhydride | 15 parts by weight |
| Solvent (MEK/Toluene = 1/1) | 60 parts by weight |

We claim:
1. A resinous flooring sheet, which comprises: a transparent synthetic resin intermediate layer laminated on the surface of a light-shielding resinous base sheet, a light-shielding pattern formed by application of a light-shielding ink provided on the surface of said transparent synthetic resin intermediate layer, a non-light-shielding pattern formed by application of a non-light-shielding ink provided on at least a part of the surface of said light-shielding pattern and a transparent synthetic resin layer laminated on the entire outer surface including said transparent synthetic resin intermediate layer and said light-shielding and said non-light-shielding patterns.

2. A resinous flooring sheet according to claim 1, wherein at least one of the light-shielding resinous base sheet and the light-shielding pattern is colored with a colorant principally composed of a white light-shielding pigment.

3. A resinous flooring sheet according to claim 1, wherein at least one of the light-shielding resinous base sheet and/or the transparent synthetic resin intermediate layer contain a pigment having pearl-like luster.

4. A resinous flooring sheet according to claim 1, wherein the transparent synthetic resin intermediate layer has a thickness of 0.1 mm to 1.0 mm.

5. A resinous flooring sheet according to claim 1, wherein the light-shielding resinous base sheet has an embossed pattern.

* * * * *